Patented July 1, 1941

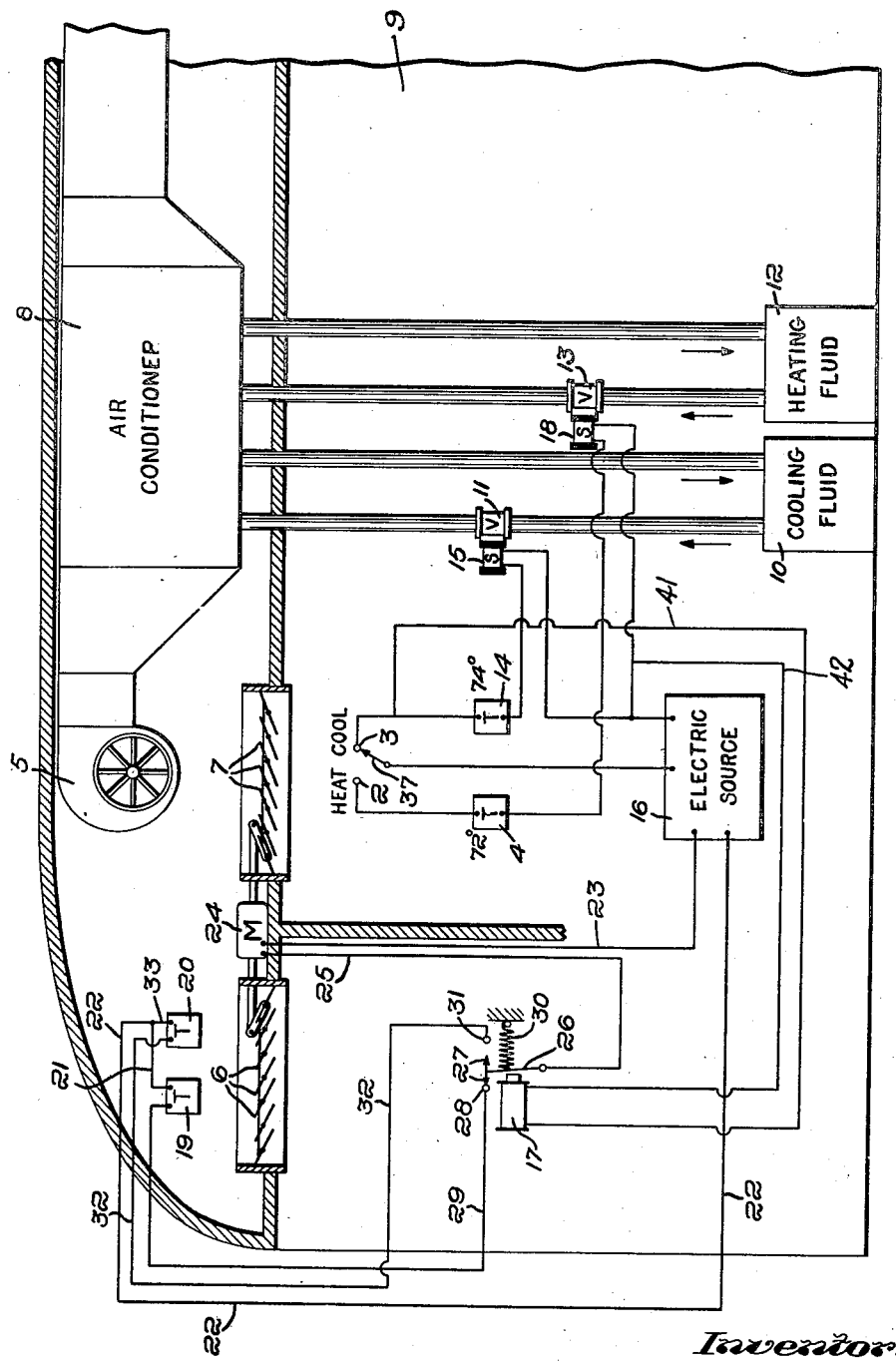

2,247,542

UNITED STATES PATENT OFFICE 2,247,542

THERMOSTATIC AIR CONDITIONING CONTROL

Samuel M. Anderson, Sharon, Mass., assignor to B. F. Sturtevant Company, Hyde Park, Boston, Mass.

Application February 15, 1939, Serial No. 256,467

2 Claims. (Cl. 257—3)

This invention relates to air conditioning systems and relates more particularly to seasonal controls for air conditioned passenger vehicles.

In the past, air conditioning systems for railway passenger cars have been operated to condition about 75% recirculated air and 25% outdoor air. Such a large percentage of recirculated air has resulted in unpleasant odors, germ laden air and conditioned air of low quality. The large percentage of recirculated air has been thought necessary for reasons of economy.

According to this invention, 100% outdoor air is used the greater portion of the time in both cooling and heating seasons and recirculated air is used only under extreme temperature conditions which would cause overloading of the cooling or heating equipment if all outdoor air were used. Thermostatic controls are provided for so operating the air conditioning systems that 100% outdoor air is used when the additional expense is compensated for by the increased benefits and recirculated air is used only when the expense of having all outdoor air is out of proportion to the benefits gained.

An object of the invention is to supply all outdoor air to air conditioned passenger vehicles when outdoor temperature conditions are such that too great a load on the air conditioning equipment is not required.

Another and more definite object of the invention is to provide satisfactory controls for supplying all outdoor air to an air conditioned passenger vehicle when economically feasible.

Other objects of the invention will be apparent from the following description and from the drawing.

The invention will now be described with reference to the drawing which illustrates diagrammatically one embodiment of the invention applied to a railway passenger car.

With reference to the drawing, the blower 5 draws outdoor air through the dampers 6 and recirculated air through the dampers 7 and passes the air through the air conditioning unit 8 placed in one end and in the roof zone of the car 9.

The source 10 is adapted to supply cooling fluid through the valve 11 to the unit 8. The source 12 is adapted to supply heating fluid through the valve 13 to the unit 8.

With the seasonal control arm 37 placed on the contact 3 as illustrated, the cooling thermostat 14 is energized from the electric source 16, and the heating thermostat 4 is disconnected from the source. When the arm 37 is placed on the contact 2, the cooling thermostat 14 is disconnected and the heating thermostat 4, connected to the electric source.

When the car temperature rises above, say 74° F., with the arm 37 on contact 3 for cooling, the thermostat 14 closes an electric circuit including the solenoid 15 and the electric source 16 causing the solenoid 15 to open the valve 11 to cause the fluid under pressure from the source 10 to circulate through the unit 8. At the same time a circuit including the contact 3, the arm 37, the wires 41 and 42, the electric source 16 and the relay solenoid 17 is closed causing the relay to become energized and pull its armature 26 up and the contact 27 against the contact 28. This closes another circuit including the electric source 16, the wire 23, the damper motor 24, the wire 25, the armature 26, contacts 27 and 28, the wire 29, the wet bulb thermostat 19 in the outdoor air stream, and the wire 22. This places the thermostat 19 in control of the damper motor 24 during the cooling season.

When the outdoor wet bulb temperature is below, say 70° F., the contacts of the thermostat 19 separate to open the last described circuit causing the motor 24 to become deenergized causing it to adjust the dampers 6 and 7 to 100% outdoor air. When the outdoor wet bulb temperature is above 70° F., the load on the refrigerating plant would be too great and the last described circuit is closed by the thermostat 19 causing the motor 24 to adjust the dampers for partial recirculation. The thermostat 19 thus acts during the cooling season to adjust the dampers for 100% outdoor air when the outdoor wet bulb temperature is below 70° F., and to adjust the dampers for partial recirculation when the wet bulb temperature of the outdoor air is above 70° F.

In the heating season with the arm 37 on contact 2, when the car temperature drops below say 72° F., the electric circuit including the thermostat 4, the electric source 16, and the solenoid 18 is opened, causing the solenoid 18 to become deenergized to open the valve 13 to supply heat from the source 12 to the unit 8.

When the relay solenoid 17 is deenergized, it acts as an auxiliary seasonal control to connect the damper motor 24 to the thermostat 20 by releasing its armature 26 which then falls back to cause the contact 27 to strike the contact 31. This disconnects the thermostat 19 from the damper motor 24 and connects the motor 24 through the wire 25, contacts 27 and 31, and wire 32 to the thermostat 20.

The thermostat 19 is disconnected by the relay armature 26 and control 27 from the damper motor 24 when the relay is deenergized during the heating season and the thermostat 20 is connected to the damper motor. The thermostat 20 thus acts during the heating season to control the damper motor 24 and through its action, the admission of outdoor air into the system. The thermostat 20 preferably is adjusted to close its contacts at 25° F., if the conditioner 8 is a dry coil conditioner, and to close its contacts at 34° F., if the conditioner includes spray nozzles. Its contacts are open above said control temperatures of 25° F. or 34° F. When its contacts are open, the electric circuit including the thermostat 20, the wires 33 and 22, the electric source 16, the wire 23, the damper motor 24, the wire 25, the relay armature 26, the contact 27, the contact 31, (when the relay solenoid 17 is deenergized) and the wire 32 is open and the motor 24 is deenergized causing it to adjust the dampers for 100% outdoor air.

When the outdoor temperature falls below the lower limit temperatures of 34° F. or 25° F., as the case may be, the last described circuit is closed, causing the motor 24 to become energized and to adjust the dampers 6 and 7 for partial recirculation. This control permits 100% outdoor air when the load on the heating system would not be too great considerating the benefits of all outdoor air, and converts the system to partial recirculation when the outdoor temperature is too low for the economic use of all outdoor air and when its temperature approaches the freezing point of water when water is sprayed in the conditioner.

This invention is seen to provide for thermostatic control of the admission of outdoor air during the cooling season; for separate thermostatic control of the admission of outdoor air during the heating season, and for a seasonal control for selecting the thermostatic control to be used.

While one embodiment of the invention has been described for the purpose of illustration, it should be understood that the invention is not limited to the exact apparatus and arrangement of apparatus illustrated since modifications thereof may be suggested by those skilled in the art without departure from the substance of the invention.

What is claimed is:

1. An air conditioning system including a heat exchanger, means for supplying outdoor air and recirculated air to said exchanger, cooling means for supplying a cooling fluid to said exchanger, heating means for supplying a heating fluid to said exchanger, means including a first indoor thermostat for adjusting said cooling means, means including a second indoor thermostat for adjusting said heating means, a seasonal control for rendering one of said thermostats ineffective and the other effective, dampers in said first mentioned means, means including a first wet bulb thermostat exposed to outdoor air for adjusting said dampers to increase the proportion of outdoor air to said exchanger when the wet bulb temperature is below a predetermined point and to decrease the proportion of outdoor air to said exchanger when the outdoor wet bulb temperature is above said point, means for rendering said wet bulb thermostat effective when said first indoor thermostat has been rendered effective by said control, means including a second wet bulb thermostat exposed to outdoor air for adjusting said dampers to increase the proportion of outdoor air to said exchanger when the wet bulb temperature of the outdoor air is above a predetermined lower temperature and for decreasing the proportion of outdoor air to said exchanger when the wet bulb temperature of the outdoor air is below said lower predetermined temperature, and means for rendering said second wet bulb thermostat effective and for rendering said first wet bulb thermostat ineffective when said control has rendered said second indoor thermostat effective.

2. An air conditioning system including a heat exchanger, means for supplying outdoor and recirculated air to said exchanger, cooling means for supplying a cooling medium to said exchanger, heating means for supplying a heating fluid to said exchanger, means including a first indoor thermostat for adjusting said cooling means, means including a second indoor thermostat for adjusting said heating means, a seasonal control for rendering one of said thermostats effective and the other ineffective, dampers in said first mentioned means, means including an outdoor wet bulb thermostat for adjusting said dampers for increasing the proportion of outdoor wet bulb air for outdoor temperatures above a predetermined minimum and for decreasing the proportion of outdoor air for outdoor wet bulb temperatures below said minimum, and means for rendering said outdoor thermostat effective when said control has rendered said second indoor thermostat effective.

SAMUEL M. ANDERSON.